United States Patent
Valles

(10) Patent No.: US 7,077,022 B2
(45) Date of Patent: Jul. 18, 2006

(54) SYSTEM AND METHOD FOR PREFORMING CABLE FOR PROMOTING ADHESION TO OVERMOLDED SENSOR BODY

(75) Inventor: Benjamin Valles, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 218 days.

(21) Appl. No.: 10/792,599

(22) Filed: Mar. 3, 2004

(65) Prior Publication Data

US 2005/0193838 A1    Sep. 8, 2005

(51) Int. Cl.
*G01D 11/24* (2006.01)
*B29C 65/70* (2006.01)

(52) U.S. Cl. ...................... 73/866.1; 264/241
(58) Field of Classification Search ................ 73/866.1, 73/866.5; 439/34, 218, 253, 257, 271, 274, 439/275, 278, 279; 264/241
See application file for complete search history.

(56) References Cited

U.S. PATENT DOCUMENTS

| 4,632,482 A | * | 12/1986 | Punako et al. ............... 439/587 |
| 4,674,816 A | | 6/1987 | Frenznick et al. .......... 439/588 |
| 4,849,728 A | | 7/1989 | Goll et al. |

FOREIGN PATENT DOCUMENTS

| GB | 2151416 | 7/1985 |
| JP | 07264745 | 10/1995 |

OTHER PUBLICATIONS

European Search Report EP05075459 dated Jul. 6, 2005 & Annex to the European Search Report.

* cited by examiner

*Primary Examiner*—Daniel S. Larkin
(74) *Attorney, Agent, or Firm*—Jimmy L. Funke

(57) ABSTRACT

The end portion of the insulation sheath of a cable is formed into a grommet to promote better mechanical bonding with a vehicle sensor housing that is overmolded onto the cable.

18 Claims, 1 Drawing Sheet

SYSTEM AND METHOD FOR PREFORMING CABLE FOR PROMOTING ADHESION TO OVERMOLDED SENSOR BODY

FIELD OF THE INVENTION

The present invention relates generally to vehicle sensors.

BACKGROUND

Most motor vehicles include a plethora of sensors and actuators incorporated into the vehicle control systems, such as the anti-lock braking system (A.B.S.), the traction control system (T.C.S.), and the vehicle stability enhancement control system (V.S.E.). Many of the vehicle sensors have housings that are connected to the cable from other components. Regardless, these housings are disposed in the vehicle. The connections between the cable and housings have been known to come loose and become dysfunctional. In current housing-cable connections, very little resistance is provided in preventing cable detachment, because while the housings can be overmolded onto the cable insulation for better mechanical connection, the overmolded sensor housing nonetheless may not always properly adhere to the cable.

SUMMARY OF THE INVENTION

A sensor housing assembly includes a hollow plastic sensor housing and a pressure struded cross-linked electrical cable over at least a portion of which the housing is molded. The portion forms a grommet to promote bonding between the housing and cable.

The sensor may be a vehicle sensor, such as a temperature sensor, pressure sensor, oil condition sensor, magnetic sensor, or other sensor, and the housing may be disposed in a vehicle.

In a preferred embodiment, the cable can include at least one electrical conductor inside an electrically insulative sheath, with the sheath being formed with the grommet. The grommet may include plural ribs, with adjacent ribs being separated by a groove. The ribs and grooves can have rectilinear cross-sections and can be oriented perpendicularly to a long axis of the cable and extend completely around the circumference of the cable.

In another aspect, a method for engaging a cable with a plastic housing includes forming at least one circumferential rib and at least one circumferential groove in an end segment of the cable, and then disposing the cable in a mold. The method then includes overmolding the housing onto at least the segment using the mold, whereby the segment contour promotes engagement of the housing and cable.

In still another aspect, a vehicle sensor includes a sensor housing, at least one electrical terminal in the housing, and at least one cable electrically connected to the terminal. The housing is overmolded on the cable. Means are formed on the cable for promoting engagement of the cable with the housing.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
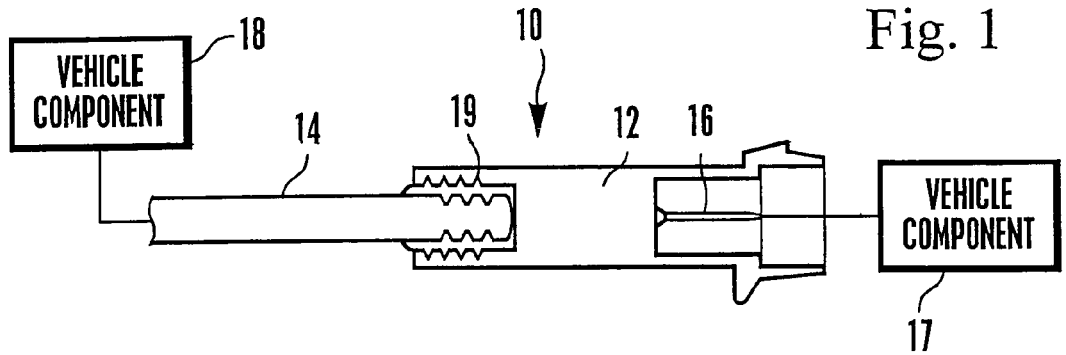
FIG. 1 is a cross-sectional view of the present cable engaged with a sensor housing that has been overmolded onto it.

Referring initially to FIG. 1, a system is shown, generally designated 10, that includes a hollow, plastic sensor housing 12 that is overmolded onto an electrical cable 14, such as a pressure struded cross-linked electrical cable. The cable 14 includes at least one (and usually two) electrical conductors inside an electrically insulative sheath, as further discussed below.

The sensor in the housing 12 can perform a number of different functions. For instance, the sensor may be a temperature sensor, pressure sensor, oil condition sensor, magnetic sensor, or other sensor. The function of the sensor, however, is irrelevant to the invention at hand.

As shown in FIG. 1, one or more electrical terminals 16 are mounted in the housing 12, and may be connected to a first vehicle component 17, such as, e.g., a corresponding electrical socket on a sensor, or other electrical interface. It is to be understood that the terminal or terminals 16 are electrically connected to corresponding conductors in the cable 14. The cable 14 is electrically connected in turn to a second vehicle component 18, such as, e.g., a vehicle onboard computer or ECM. FIG. 1 shows that if desired, a rubber or plastic sleeve 19 with axially-spaced outwardly protruding radial lips can be sandwiched between the cable 14 and housing 12.

Figure 2:
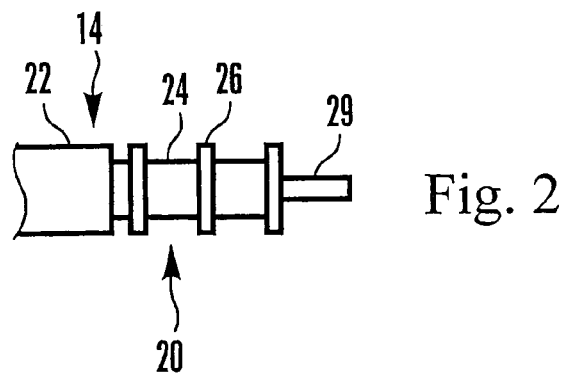
FIG. 2 is a side view of the housing end of the cable, showing the pre-formed grommet.

Now referring to FIG. 2, the electrical cable 14 has a housing end segment 20 that, like the remainder of the outer cylindrical surface of the cable, is covered by an electrically insulative sheath 22. However, at the housing end 20 the sheath 22 is formed with a grommet that is established by alternating grooves 24 and ribs 26, each of which preferably has a rectilinear cross-section and each of which preferably extends completely around the circumference of the cable 14. The ribs 26 and grooves 24 preferably are oriented perpendicularly to the long axis of the cable as shown. The grooves 24 and ribs 26 are made integrally with the sheath 22 as set forth further below. One or more electrical conductors 29 protrude from the end of the sheath 22 as shown.

Figure 3:
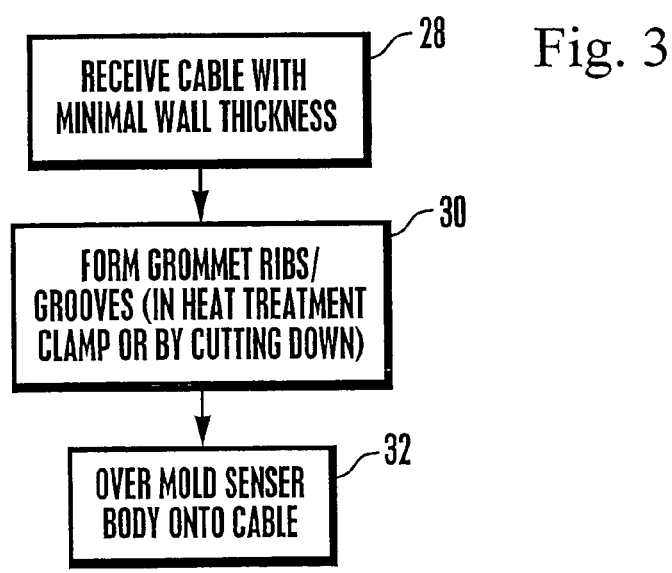
FIG. 3 is a flow chart of the method for making the sensor housing with cable.

Now referring to FIG. 3, the procedure for mutating the sheath 22 to have the grommet configuration shown in FIGS. 1 and 2 can be seen. Commencing at block 28, the cable is received without the grommet and preferably with a minimal wall thickness. At block 30, the grommet is formed. In one embodiment this can be done by placing the housing end 20 of the electrical cable 14 in a heat treatment fixture clamp, which has the groove/rib structure formed on it. This clamp is then closed and heated, deforming the sheath 22 to assume the configuration of the clamp, i.e., to have the grommet impressed on it. An alternative method of forming the grommet in the electrical cable 14 is to cut the grooves 24 into the sheath 22 by hand or by machine. In either case, it will be appreciated that the grommet is formed integrally in the sheath 22.

Once the grommet is formed, at block 32 the cable 14 is positioned in a housing mold and the hollow, plastic sensor housing 12 is overmolded onto the housing end 20 of the sheath 22, with the conductors 29 of the cable 14 in electrical engagement with the terminals 16 of the housing 12. The material that is overmolded onto the sheath 22 flows into the grooves 24, providing improved engagement of the cable 14 with housing 12, compared to cables without the present grommet.

It is to be understood that the current figure shows only three grooves 24 and three ribs 26, more grooves and ribs (or less) can be formed.

While the particular SYSTEM AND METHOD FOR PREFORMING CABLE FOR PROMOTING ADHESION TO OVERMOLDED SENSOR BODY as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A sensor housing assembly, comprising:
   a hollow plastic sensor housing; and
   an electrical cable over at least an insulating portion of which the housing is molded, the portion forming a grommet to promote bonding between the housing and cable.

2. The assembly of claim 1, wherein the cable is a pressure struded cross-linked cable, the sensor is a vehicle sensor, and the housing is disposable in a vehicle.

3. The assembly of claim 1, wherein the cable includes at least one electrical conductor inside an electrically insulative sheath establishing the insulating portion, the sheath being formed with the grommet.

4. The assembly of claim 3, wherein the grommet includes plural ribs, adjacent ribs being separated by a groove.

5. The assembly of claim 4, wherein the ribs and grooves have rectilinear cross-sections.

6. The assembly of claim 4, wherein at least one rib and at least one groove are oriented perpendicularly to a long axis of the cable and extend completely around the circumference of the cable.

7. The assembly of claim 4, comprising three ribs.

8. A method for engaging a cable with a plastic housing, comprising:
   forming at least one circumferential rib and at least one circumferential groove in an end segment of an insulating sheath of the cable;
   disposing the cable in a mold; and
   overmolding the housing onto at least the segment using the mold, whereby the segment contour promotes engagement of the housing and cable.

9. The method of claim 8, wherein the rib and groove establish at least a portion of a grommet segment.

10. The method of claim 9, wherein the grommet segment is formed integrally in a sheath of the cable.

11. The method of claim 10, wherein the grommet segment is cut into the sheath.

12. The method of claim 10, wherein the end segment is placed in a grommet mold and the grommet segment is formed by heating the grommet mold around the end segment.

13. A vehicle sensor, comprising:
   a sensor housing;
   at least one electrical terminal in the housing;
   at least one cable electrically connected to the terminal, the housing being overmolded on the cable; and
   a grommet formed in a unitary insulating sheath that closely surrounds and contacts at least one electrical conductor of the cable.

14. The sensor of claim 13, wherein the sensor is a vehicle sensor and the housing is disposed in a vehicle.

15. The sensor of claim 13, wherein the grommet includes plural ribs, adjacent ribs being separated by a groove.

16. The sensor of claim 15, wherein the ribs and grooves have rectilinear cross-sections.

17. The sensor of claim 15, wherein at least one rib and at least one groove are oriented perpendicularly to a long axis of the cable and extend completely around the circumference of the cable.

18. The sensor of claim 13, wherein the cable is a pressure struded cross-linked electrical cable.

* * * * *